L. A. LOWREY.
COTTON TOPPER.
APPLICATION FILED JUNE 22, 1909.
1,002,412.
Patented Sept. 5, 1911.
2 SHEETS—SHEET 2.
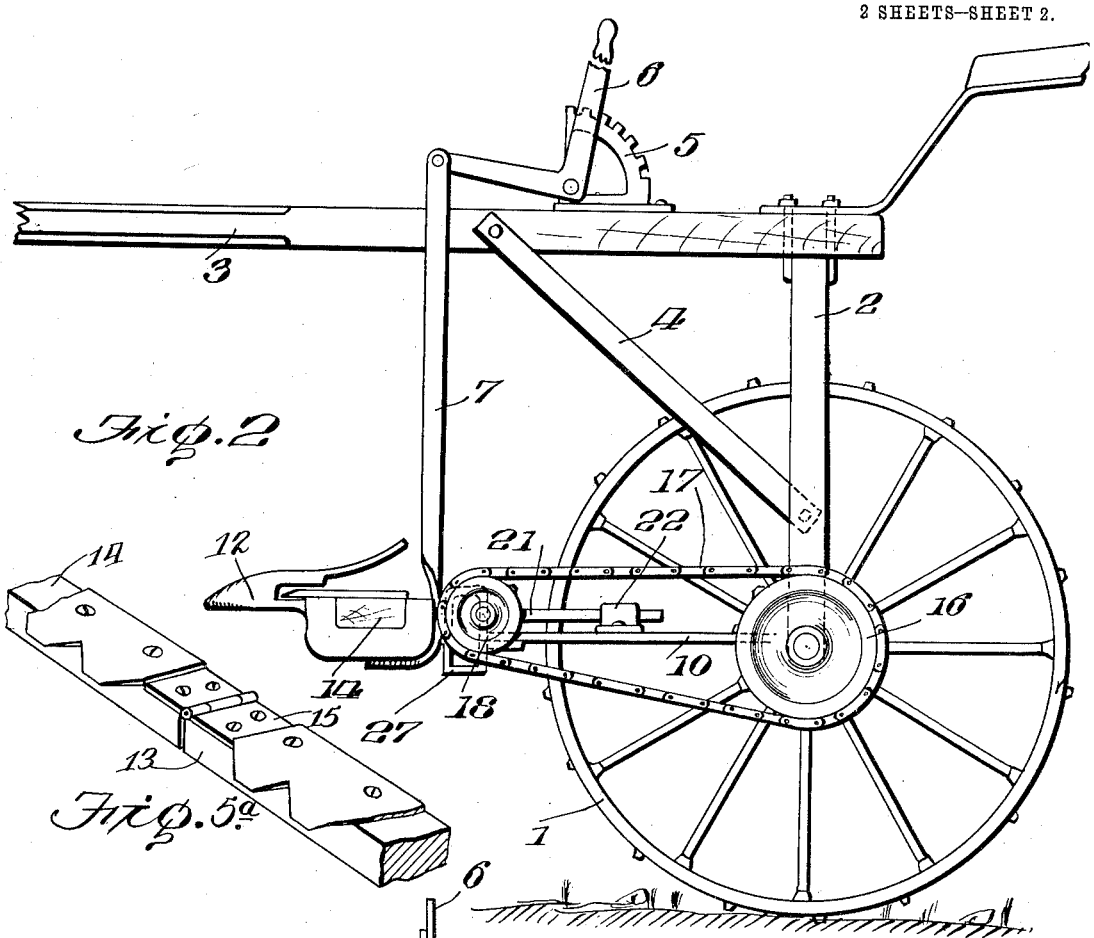
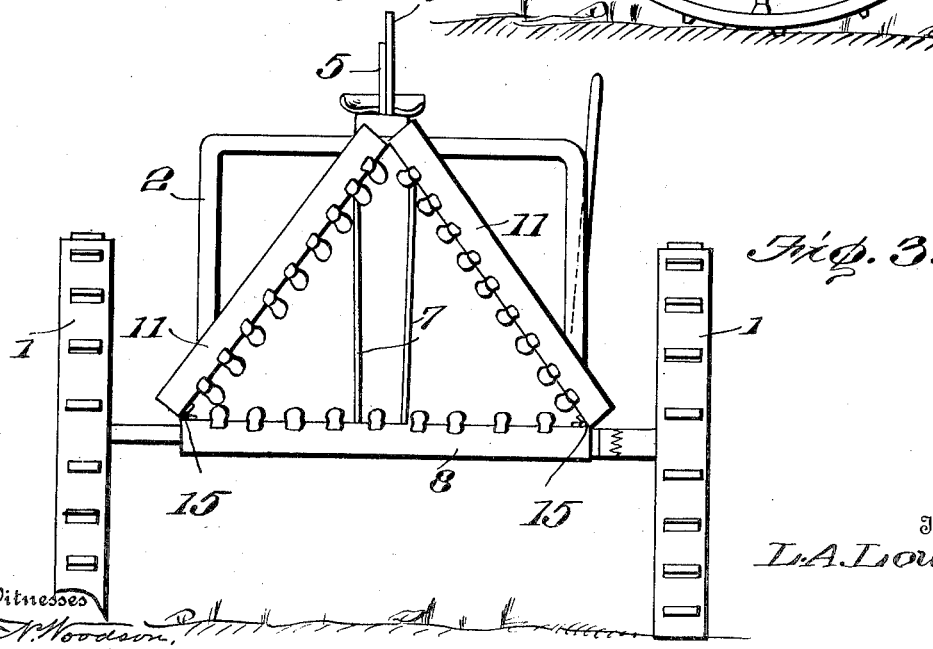
Witnesses
W. T. Woodson,
Juana M. Fallin,
Inventor
L. A. Lowrey
By
Attorneys.

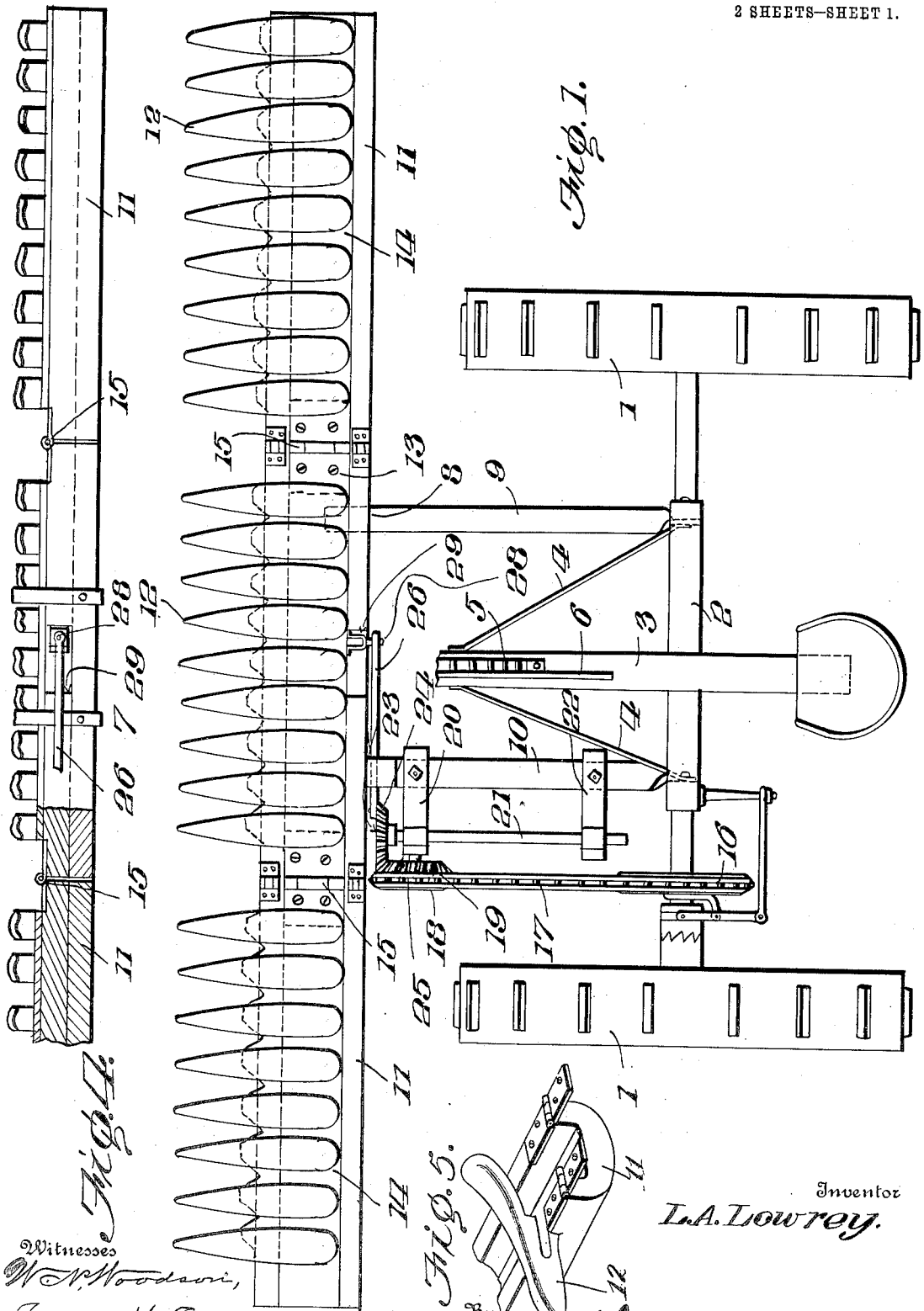

UNITED STATES PATENT OFFICE.

LUTHER A. LOWREY, OF FREDERICK, OKLAHOMA.

COTTON-TOPPER.

1,002,412.      Specification of Letters Patent.      Patented Sept. 5, 1911.

Application filed June 22, 1909. Serial No. 503,741.

*To all whom it may concern:*

Be it known that I, LUTHER A. LOWREY, citizen of the United States, residing at Frederick, in the county of Tillman and State of Oklahoma, have invented certain new and useful Improvements in Cotton-Toppers, of which the following is a specification.

This invention comprehends certain new and useful improvements in harvesting machines and relates particularly to cotton toppers.

The invention has for its primary object an improved construction of cotton topper which will top three rows at the same time, and the invention also has for its object a simple, durable and efficient construction of agricultural implement of this character embodying a main middle cutting section and two side sections that are hinged to the ends of the main intermediate section and that are designed in the operative position to project out beyond the traveling wheels of the machine, and when not in use are designed to be folded upwardly and inwardly within the margins of said wheels so as to not interfere with the traveling of the machine from and to the fields.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a top plan view of my improved cotton topper; Fig. 2 is a side view thereof; Fig. 3 is a front view of the machine with the cutter mechanism arranged in inoperative position; Fig. 4 is a detail view partly in section illustrating a portion of the cutting mechanism. Fig. 5 is a detail perspective view of a portion of the cutting mechanism. Fig. 5ª is a similar view of another portion of the cutting mechanism.

Corresponding and like parts are referred to in the following description and indicated in all the views of the accompanying drawings by the same reference characters.

Referring to the drawings the numeral 1 designates the ground or traveling wheels of my improved cotton topper, the wheels being journaled on stub axles which project outwardly from an arched frame 2.

3 designates the draft pole or tongue which is secured at its rear end to the main upper cross bar of the frame 2 and which is preferably braced as at 4. A quadrant 5 is secured to the tongue 3 and a bell crank handle lever 6 is fulcrumed at its elbow on the tongue alongside of the quadrant being provided with a detent arranged for locking engagement with the quadrant. The forwardly projecting arm of the lever 6 is secured to the stirrup bar 7 which extends downwardly on opposite sides of the tongue 3 and which is provided with angularly disposed lower ends which are secured by bolts or other fastening devices to a main intermediate or middle finger bar 8. This latter is pivotally secured to the main supporting frame 2 by means of brace rods 9 and 10.

11 designates tiltable swinging side sections of the finger bar, the same being hinged at their inner ends to the end of the main section 8 of the finger bar so as to swing about substantially horizontal axes. These side sections are designed to be swung out beyond the ground wheels 1 in the operative position of the parts and be supported in substantial alinement with the middle section 8, and when the machine is not in use it is intended that the side sections shall be swung upwardly and inwardly so as to be entirely out of the way when the machine is traveling along the road.

The side sections 11 as well as the middle section 8 are provided with guard fingers 12 and a coacting cutter bar which latter is constructed in three sections, namely a middle section 13 working in the middle finger bar section 8 and side sections 14 working in the side sections 11 of the finger bar. The side sections 14 are hinged at their ends to the ends of the middle section 14 as indicated at 15 so as to provide for the swinging movement of the finger bar side sections before described.

A driving sprocket 16 is mounted on one of the stub axles of the frame 2, and a chain 17 extends over said sprocket wheel 16 and over a sprocket wheel 18 mounted on a stub shaft 19 which projects outwardly from a laterally extending bracket 20 secured to the brace rod 10. A longitudinally extending shaft 21 is journaled in this bracket 20 and in a corresponding bracket 22 also secured to the brace rod 10; the first named shaft carries at one end a crank disk 23 which is formed with a bevel pinion 24 meshing with a corresponding pinion 25 formed on the sprocket wheel 18. A pitman 26 is operatively connected to the crank disk 23 and works through an opening 27 formed on the adjacent brace rod 10, the pitman being connected at its one end to a pin 28 which projects rearwardly from the middle section 13 of the cutter bar, this pin having movement in a recess 29 which is formed in the rear face of the middle section 8 of the finger bar.

From the foregoing description in connection with the accompanying drawings, it will be understood that when the machine is operating, power will be imparted from the ground wheels to the sprocket wheel 16 and through the instrumentality of the gearing before described be transmitted to the middle section 13 of the cutter bar and also the side sections 14, thereby enabling the machine to top three rows at the same time. When the machine is traveling along the road, it is of course to be understood that the side sections of the finger bar and guard finger will be folded upwardly and inwardly so as to lie within the margin of the ground wheels 1 and that the clutch which connects the driving sprocket to the stub axle on which it is mounted will be thrown out so as to avoid the reciprocating of the cutter bar. By manipulating the lever 6, the cutter may be held at the desired elevation according to the height of the cotton which is being topped.

It is to be noted that the finger bar sections are channeled to receive the cutter bar sections, that the cutter bar sections are substantially flush at their upper faces with the upper edges of the flanges defining the channels of the finger bar sections, and that the hinges which directly connect the adjoining ends of the finger bar sections, are arranged in pairs, front and rear, secured to the upper edges of said flanges, the hinges 15 for the cutter bar sections being secured to the upper face of the cutter bar sections at the ends, whereby the hinges 15 will lie in the same horizontal plane as the front and rear hinges for the finger bar sections and thereby permit the two side sections to be folded inwardly over the main section so as to engage with each other at their free ends, as illustrated in Fig. 3, when one set of hinges is brought into registry with the other set of hinges.

Having thus described the invention, what is claimed as new is:

A cotton topper, comprising a wheeled frame, a sectional finger bar carried by said frame and formed of three sections hingedly connected together at their adjoining ends, the middle section being rigidly connected to the frame, a cutter bar also constructed of three similar sections, one for each finger bar and having their adjoining ends hingedly connected together in alinement with the hinged members of the finger bar, said finger bar sections having square ends adapted to abut against one another when the sections are in a horizontal position, and actuating mechanism connected to the middle section of the cutter bar, the outer or side sections of the finger bar and the corresponding sections of the cutter bar being capable of swinging into engagement with each other over the middle sections.

In testimony whereof I affix my signature in presence of two witnesses.

LUTHER A. LOWREY. [L. s.]

Witnesses:
  JNO. B. WILSON,
  GEORGE A. AHERN.